(12) United States Patent
Prabhu et al.

(10) Patent No.: US 12,500,846 B2
(45) Date of Patent: Dec. 16, 2025

(54) DYNAMIC MANAGEMENT OF DEJITTER BUFFER IN AN EMULATION BASED SYSTEM

(71) Applicant: Cisco Technology, Inc., San Jose, CA (US)

(72) Inventors: Sundeep P. Prabhu, Bangalore (IN); Raghupathi Somashekarappa, Bangalore (IN); Luca Della Chiesa, Concorezzo (IT); Christian Schmutzer, Koenigsbrunn im Weinviertel (AT)

(73) Assignee: Cisco Technology, Inc., San Jose, CA (US)

( * ) Notice: Subject to any disclaimer, the term of this patent is extended or adjusted under 35 U.S.C. 154(b) by 148 days.

(21) Appl. No.: 18/421,957

(22) Filed: Jan. 24, 2024

(65) Prior Publication Data

US 2025/0240251 A1    Jul. 24, 2025

(51) Int. Cl.
*H04L 47/30* (2022.01)
*H04L 47/2416* (2022.01)
*H04L 47/62* (2022.01)

(52) U.S. Cl.
CPC .......... *H04L 47/30* (2013.01); *H04L 47/2416* (2013.01); *H04L 47/6225* (2013.01)

(58) Field of Classification Search
CPC .. H04L 47/30; H04L 47/2416; H04L 47/6225
See application file for complete search history.

(56) References Cited

U.S. PATENT DOCUMENTS

| | | | |
|---|---|---|---|
| 8,412,891 B2* | 4/2013 | Demura | G06F 13/161 711/158 |
| 8,665,892 B2* | 3/2014 | Lund | H04L 49/205 709/224 |
| 2004/0044810 A1 | 3/2004 | Routliffe et al. | |
| 2007/0280277 A1 | 12/2007 | Lund | |
| 2017/0180275 A1 | 6/2017 | Krinsky | |
| 2020/0153525 A1 | 5/2020 | Annavajjala et al. | |
| 2023/0050776 A1 | 2/2023 | Livne et al. | |

* cited by examiner

*Primary Examiner* — G. C. Neurauter, Jr.
(74) *Attorney, Agent, or Firm* — Patterson + Sheridan, LLP (57) ABSTRACT

Techniques for management of a dejitter buffer for network communication. A system includes ports to receive emulated traffic transmitted over a packet network, a central memory pool, a controller to allocate memory from the central memory pool dejitter buffers, and an arbiter to arbitrate read and write access from the ports to the central memory pool for the of dejitter buffers. A portion of the central memory pool is allocated as a respective dejitter buffer for each of the plurality of ports, based on a transmission rate associated with each respective port. The controller is capable of allocating any portion of the central memory pool as the dejitter buffer for any respective port, and the controller is configured to, during operation, dynamically change the portion of the central memory pool allocated as the dejitter buffer for a given port.

20 Claims, 5 Drawing Sheets

DYNAMIC MANAGEMENT OF DEJITTER BUFFER IN AN EMULATION BASED SYSTEM

TECHNICAL FIELD

Embodiments presented in this disclosure generally relate to network communications. More specifically, one or more embodiments disclosed herein relate to dynamic management of a dejitter buffer.

BACKGROUND

Dejitter buffers can be used to compensate for packet delay variations on packet networks. For example, a dejitter buffer can be used to provide constant bit rate (CBR) data to clients in a communication network carrying emulated traffic. Typically, dejitter buffers are implemented in field-programmable gate array (FPGA), or another suitable circuit, with a static memory size allocated for each traffic flow. A traffic flow with a lower transmission rate needs a smaller dejitter buffer to provide CBR data to clients, while a traffic flow with a higher transmission rate needs a larger dejitter buffer to provide CBR to clients. But because of static allocation of memory, the lower and higher rate traffic flows consume the same amount of memory resources, leading to inefficient memory usage. As FPGA internal memories (e.g., static random-access memory (SRAM)) are relatively expensive, this is undesirable. Further, run-time configuration of dejitter buffer memory is not possible, and any change typically requires an FPGA image change.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Embodiments include a system. The system includes a plurality of ports each configured to receive emulated traffic transmitted over a packet network, a central memory pool, a controller configured to allocate memory from the central memory pool for a plurality of dejitter buffers, and an arbiter configured to arbitrate read and write access from the plurality of ports to the central memory pool for the plurality of dejitter buffers. A portion of the central memory pool is allocated as a respective dejitter buffer, of the plurality of dejitter buffers, for each of the plurality of ports, based on a transmission rate associated with each respective port. Further, the controller is capable of allocating any portion of the central memory pool as the dejitter buffer for any respective port of the plurality of ports, and the controller is configured to, during operation, dynamically change the portion of the central memory pool allocated as the dejitter buffer for a given port.

Embodiments further include a method. The method includes receiving emulated traffic at a plurality of ports over a packet network. The method further includes allocating a portion of a central memory pool as a dejitter buffer for each of the plurality of ports, based on a transmission rate associated with each respective port. Any portion of the central memory pool can be allocated as the dejitter buffer for any respective port. The method further includes arbitrating read and write access from the plurality of ports to the central memory pool for the respective dejitter buffers, and dynamically, during operation, changing the portion of the central memory pool allocated as the dejitter buffer for a first port of the plurality of ports.

Embodiments further include a non-transitory computer program product including one or more non-transitory computer readable media containing, in any combination, computer program code that, when executed by operation of any combination of one or more processors, performs operations. The operations include receiving emulated traffic at a plurality of ports over a packet network. The operations further include allocating a portion of a central memory pool as a dejitter buffer for each of the plurality of ports, based on a transmission rate associated with each respective port. Any portion of the central memory pool can be allocated as the dejitter buffer for any respective port. The operations further include arbitrating read and write access from the plurality of ports to the central memory pool for the respective dejitter buffers, and dynamically, during operation, changing the portion of the central memory pool allocated as the dejitter buffer for a first port of the plurality of ports.

Example Embodiments

As discussed above, in an embodiment dejitter buffers can be used to compensate for the packet delay variations of emulated traffic, providing CBR data to clients. The amount of memory needed for a given dejitter buffer typically depends on the client data rate and its resulting traffic flow. A traffic flow with a lower rate needs a smaller dejitter buffer to meet the dejitter time specification, and provide CBR data, while a traffic flow with a higher rate needs a larger dejitter buffer to meet dejitter time specifications and provide CBR data.

In an embodiment, a shared memory architecture for dejitter buffers in emulation systems is a very challenging problem. For example, the number of high rate pseudo-wires required for emulation system is increasing due to channelization. As just one example, OTU4 (e.g., an optical transport network (OTN) line with a data rate of approximately 100 Gbits/second) can have up to 80 channels of different rates, where each channel maps to a pseudo-wire flow). Further, client rate requirements are increasing rapidly (e.g., from sub-1 Gbit/second to 100 Gbits/second and beyond), and requirements to support dynamic changes to jitter specifications (e.g., for each pseudo-wire flow in proportion to changes in the network) are becoming more prevalent.

Existing solutions for dejitter buffer management in emulation systems do not address these challenges. For example, one solution to dejitter buffer management could be to provide an independent dejitter buffer associated with each pseudo-wire (e.g., for each flow). The dejitter buffer is designed considering the jitter requirements of the highest supported rate on a flow. Hence, when the flow is operated at lower rates, the dejitter buffer is not fully utilized. Also, if any other port requires additional buffer space to cater to an increase in the jitter specification, the un-utilized buffer space cannot be shared from other pseudo-wires. This is discussed further, below, with regard to FIG. 2. But this is wasteful and inefficient, because each dejitter buffer must include a worst case allocation of memory, even for lower client transmission rates.

Another possible solution would be to use a pseudo-dynamic approach for buffer allocation. Here the dejitter buffer could be implemented in external memory (e.g., double data rate (DDR) memory). The external DDR memory could be divided into blocks. Each flow can use a range of blocks, ranging from minimum of j blocks to maximum of k blocks. The range is constant for each flow, irrespective of rate for a given flow. This approach has some advantages, but also has significant disadvantages. For example, if any flow is not used or not configured, then the minimum number of blocks allocated the flow gets locked. This approach also does not support fine granular stepping in buffer size allocation. Also, in case any flow requires more than k blocks for dejitter, then it cannot be supported.

In an embodiment, dejitter memory can instead be dynamically managed and allocated from a shared central memory pool. For example, an arbiter and controller can allocate necessary dejitter memory, from a shared central memory pool, for each traffic flow. This is discussed further, below, with regard to FIGS. 3-5. In an embodiment, a two stage system can be used with small per port memory and a single central memory pool. Each traffic flow utilizes a section of memory from the central pool based on the dejitter requirements of the flow. Each flow, as one example, accesses the dejitter buffer through its own unique port. A central arbiter manages the access of the different flows to the central memory pool.

One or more embodiments described herein provide numerous advantages. For example, dynamic dejitter memory allocation can provide for appropriate allocation of memory size, to provide dejitter for each flow, depending on the dejitter time requirement and respective rate of emulated traffic. This greatly improves the efficiency of memory utilization, as compared to prior solutions. Further, the increase in memory utilization efficiency can allow for an increase in the number of supported emulated traffic flow, in a given system for a given memory. And, in an embodiment, dejitter memory allocation can be modified dynamically, at run-time, if a change in dejitter time specification occurs (e.g., due to the change in network configuration).

In an embodiment, one or more techniques described herein provide for scaling of pseudo-wire flows, flexibility in buffer allocation per flow, and support for future rates. In an embodiment, these techniques do not enforce any minimum or maximum limit for the buffer utilization, and are scalable to any type of memory used. For example, an internal memory (e.g., located on a same FPGA integrated circuit as other components) can be used, or an external memory (e.g., located on a different integrated circuit from other components) can be used. Also, one or more aspects of this approach allow for support of new rates with higher jitter requirements, even after the architecture is productized and shipped, and allow scaling of the number of pseudo-wires supported. In an embodiment there is no limitation in allocating the dejitter buffer a required size for each flow, and the allocation for each flow can be done to optimize how much memory can be allocated to meet jitter specifications, helping to scale the pseudo-wire flow support.

Figure 1:
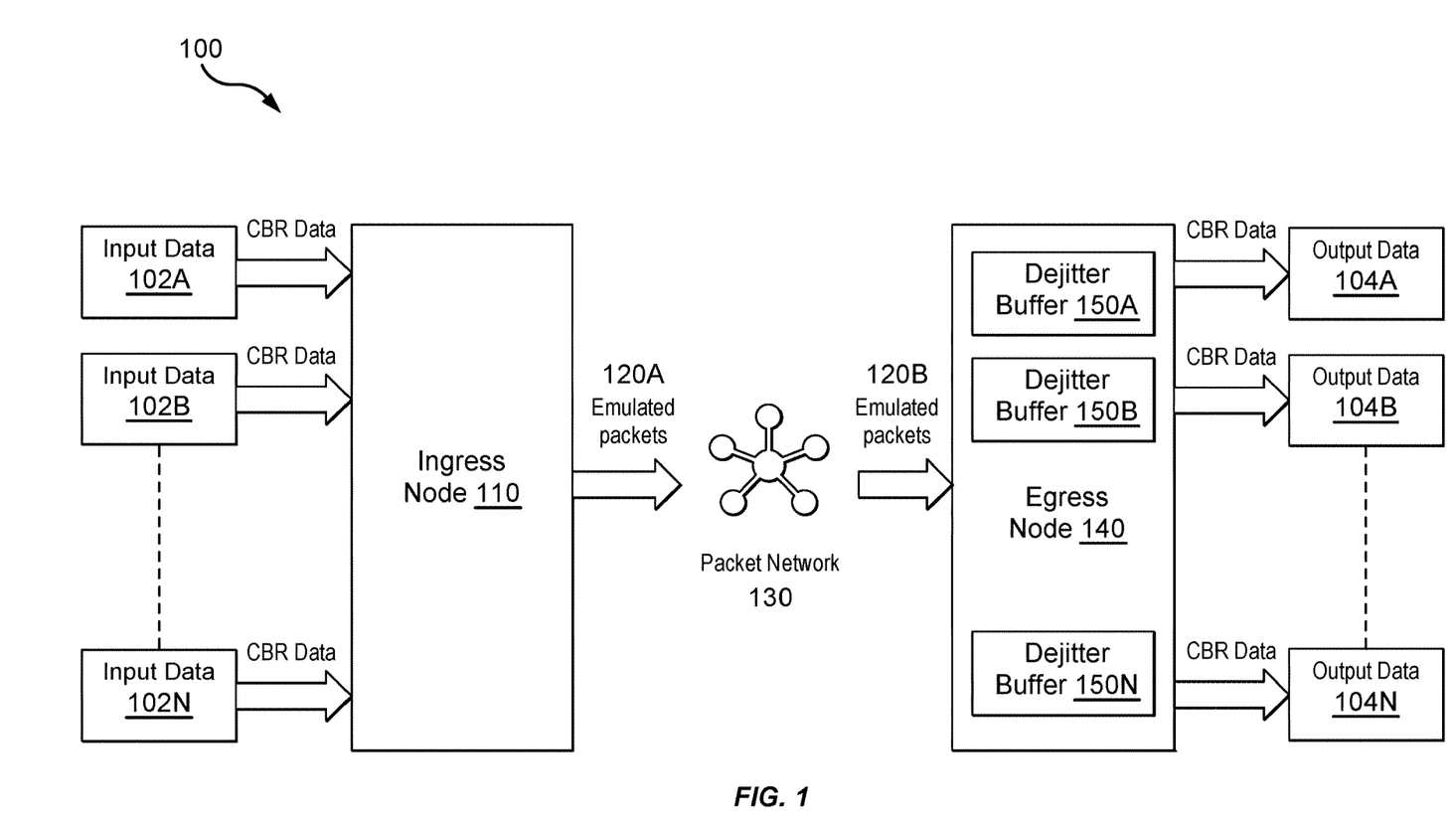
FIG. 1 illustrates dejitter buffers for transmitting emulated network traffic over a packet network, according to one embodiment.

FIG. 1 illustrates dejitter buffers for transmitting emulated network traffic over a packet network, according to one embodiment. A computing environment 100 includes a packet network 130 that carries emulated network traffic. An ingress node 110 receives input data 102A-N from transmitting clients. For example, a number of transmitting clients A-N can each transmit input data 102A-N via the ingress node. In an embodiment, the input data 102A-N is transmitted at a constant bit rate (e.g., it is CBR data).

In an embodiment, the input data 102A-N is packetized by the ingress node 110 (e.g., by an emulation element present in the ingress node 110) to generate emulated packets 120A. The emulated packets 120A are transmitted over a packet network 130 to an egress node 140. Due to delays introduced in the packet network 130 (e.g., inherent delays introduced by transmission over a packet network), the emulated packets 120A arrive at different times at the egress node 140 (e.g., as emulated packets 120B).

One or more recipient clients, however, expect that output data 104A-N provided by the egress node 140 will be CBR data (e.g., will not include any delays introduced by transmission over the packet network 130). Therefore the egress node 140 includes a number of dejitter buffers 150A-N to provide delay compensation. In an embodiment, the dejitter buffers 150A-N compensate for packet delay variations in the emulated traffic transmitted over the packet network 130, and provide CBR data for the output data 104A-N (e.g., provided to the recipient clients).

Figure 2:
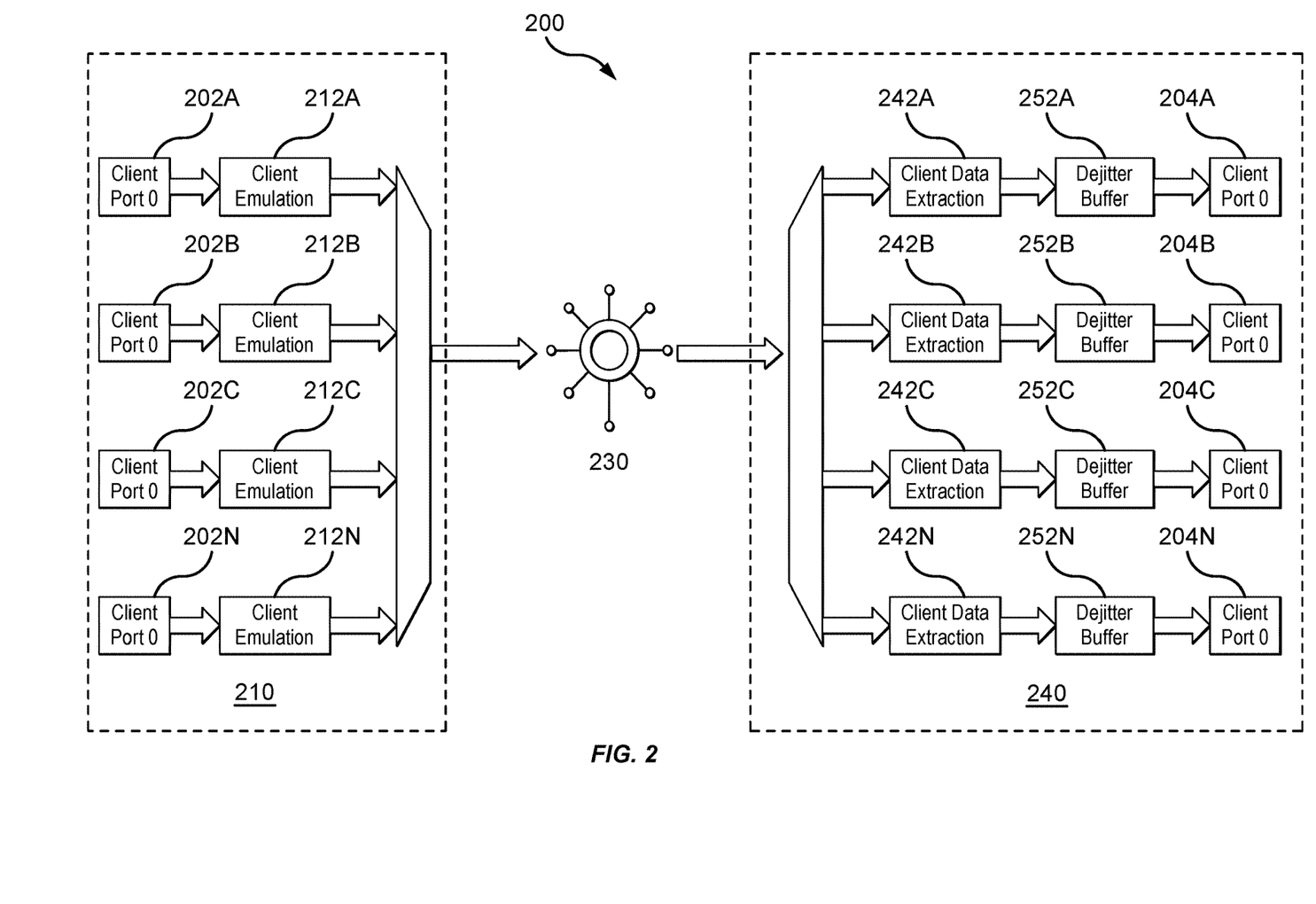
FIG. 2 illustrates a dejitter buffer system for transmitting emulated network traffic over a packet network, according to one embodiment.

FIG. 2 illustrates a dejitter buffer system 200 for transmitting emulated network traffic over a packet network, according to one embodiment. In an embodiment, a number of transmitting client ports 202A-N transmit data to a number of recipient client ports 204A-N using a packet network 220. For example, on a transmit side 210 of the system 200, a number of client emulation elements 212A-N emulate data from the client ports 202A-N for transmission over the packet network 230. The data is transmitted over the packet network 230 from the transmit side 210 to a receive side 240 (e.g., using emulated packets, as discussed above in relation to FIG. 1).

At the receive side 240, a number of client data extraction elements 242A-N extract the data (e.g., from the emulated packets) and provide the extracted data to a number of dejitter buffers 252A-N. The dejitter buffers 252A-N compensate for packet delay variations in the emulated traffic transmitted over the packet network 230, and provide CBR data for output to the client ports 204A-N.

In an embodiment, the system 200 reflects an existing solution for transmitting emulated network traffic over a packet network. The amount of memory needed for the dejitter buffers 252A-N (e.g., for each dejitter buffer 252A-N) depends on the client data rate (e.g., the data rate for transmission from the client ports 202A-N) and its resulting traffic flow. A traffic flow with a lower data rate needs smaller dejitter buffers to meet dejitter time specification, and a traffic flow with a higher data rate needs larger dejitter buffers to meet the dejitter time specification.

Typically, the dejitter buffers 252A-N are implemented with a static (e.g., worst case) memory size allocated for each emulated traffic flow A-N to allow for runtime changes of client data rates. As an example, assume the system 200 includes four client ports 202A-N, with respective line rates emulated and transmitted over the packet network 230. Assume four different line rates are used in the system 200. The port 202A is associated with a rate of 1 GFC, which is a 1 Gbit/second Fibre Channel (FC). The port 202B is associated with a rate of OC48, which is an optical carrier (OC) 48 channel with a rate of approximately 2488 Mbit/second. The port 202C is associated with a rate of OTU2, which is optical channel transport network (OTN) with a rate of approximately 10 Gbits/second. And the port 202N is associated with a rate of FC16, which is an FC16 with a rate of approximately 16 GBits/second. Thus, the line rates vary from approximately 1 Gbit/second for the 1 GFC port 202A to 16 Gbits/second for the 16GFC port 202N.

If the dejitter time specification is 400 μs, and the highest supported client rate is 16 Gbits/second (e.g., for the port 202N), a dejitter buffer must be approximately 6 Mbits to handle the highest supported transmission rate. This means that each of the dejitter buffers 252A-N must be allocated 6 Mbits, regardless of the actual transmission rates for those lines, requiring an allocation of 24 Mbits for the four dejitter buffers 252A-N.

But this is inefficient. The 1 Gbit/second 1GFC channel at the port 202A only requires 400 Kbits of dejitter buffer to meet dejitter time requirements, but because of static (e.g., worst case) allocation of memory (e.g., to allow for changes to client transmission requirements), the 1 GFC channel is also allocated a dejitter buffer of 6 Mbits, wasting more than 5 Mbits of memory. This is inefficient and expensive, especially for large implementations with numerous client ports.

Figure 3:
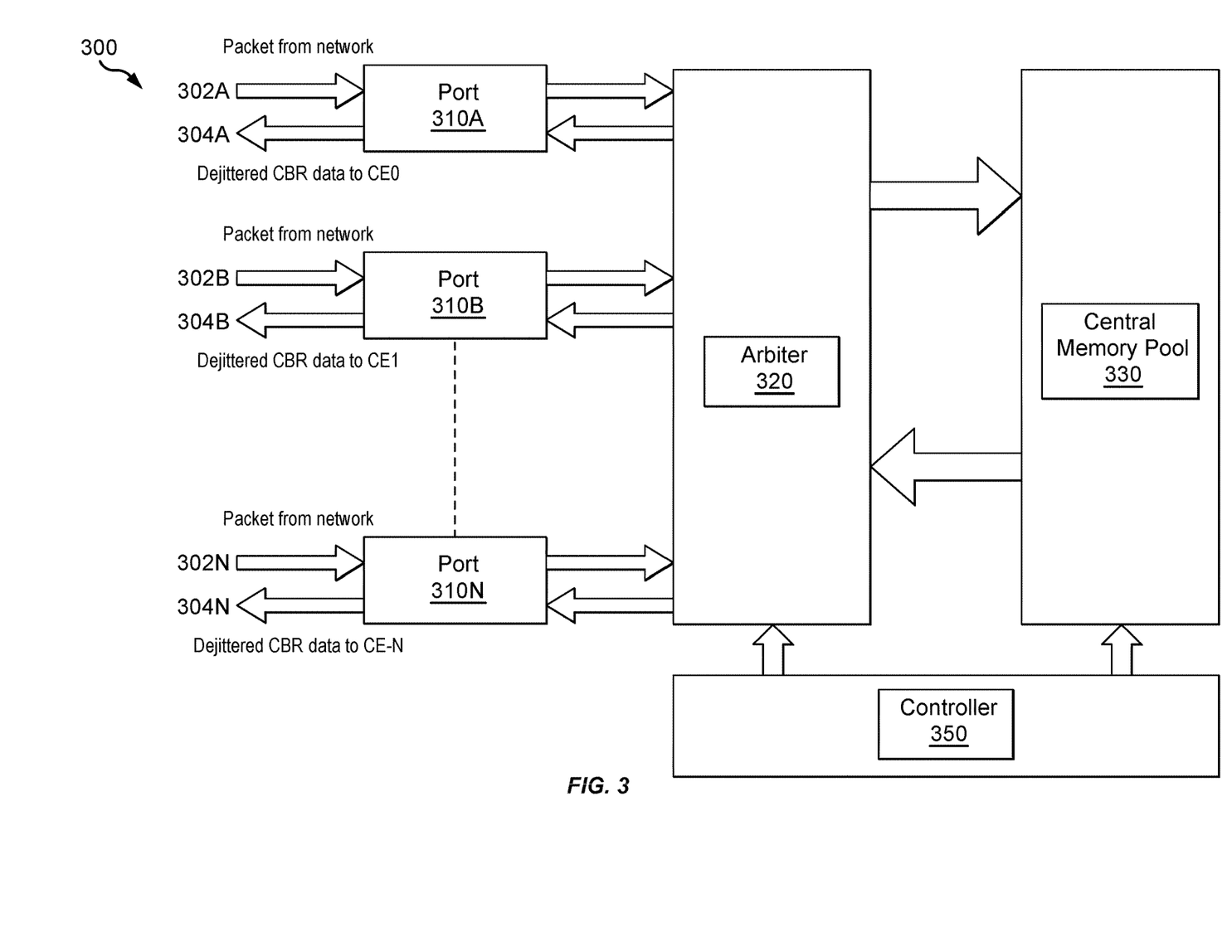
FIG. 3 illustrates dynamic management of dejitter buffers for transmitting emulated network traffic over a packet network, according to one embodiment.

FIG. 3 illustrates dynamic management of dejitter buffers for transmitting emulated network traffic over a packet network, according to one embodiment. In an embodiment, a system 300 includes a two-stage dejitter buffer in which each port includes a small per-port memory, and a single central memory pool is allocated for the remaining dejitter buffer for each port (e.g., dynamically allocated using an arbiter). For example, a number of ports 310A-N receive a traffic flow 302A-N with packets from a network (e.g., from a packet network 130 illustrated in FIG. 1). In an embodiment, the ports 310A-N are associated with any suitable output medium, including an optical fiber, copper cable, or any other suitable output medium.

Each port 310A-N corresponds with a different flow (e.g., for emulated transmission over a packet network, as discussed above in relation to FIGS. 1-2). In an embodiment, each port 310A-N provides an interface mechanism between the traffic flow 302A-N (e.g., emulated packets received from a packet network) and a central memory pool 330. The ports 310A-N each contain one or more intermediary buffers for temporary storage of data before it is written into or read from the central memory pool 330. The ports 310A-N also maintain statistics associated with the corresponding traffic flow.

Starting with the port 310A as an example, in an embodiment the port 310A provides packets from the traffic flow 302A to an arbiter 320. The arbiter 320 acts as a central arbiter to manage access of different flows (e.g., flows from each of the ports 310A-N) to a central memory pool 330. In an embodiment the arbiter 320 manages the read and write access for each of the traffic flows 302A-N to the single central memory pool 330. The arbiter 320 performs arbitration for write and read paths independently. Based on the system, different arbitration mechanisms can be used. For example, round robin arbitration can be used, or any other suitable technique.

In an embodiment memory management for the central memory pool 330 is done by a controller 350. For example, each traffic flow 302A-N can request space in the central memory pool 330 based on the dejitter requirements of the traffic flow. The controller 350 can then allocate memory for each traffic flow, based on the occupancy of the central memory pool 330 and any other suitable factors.

For example, a repository of available free space can be maintained by the controller 350. Based on availability and requested size, memory from the central memory pool 330 can be allocated for a given traffic flow and appropriate offsets can be managed by the controller 350. Further, any traffic flow can request larger or smaller memory, dynamically, at runtime. When a change of memory size is requested, the existing dejitter queue is purged. In an embodiment, the controller 350 also manages the deallocation and defragmentation of the central memory pool 330. While the arbiter 320 and the controller 350 are illustrated as separate components of the system 300, this is merely an example. In an embodiment the arbiter 320 and controller 350 are combined as a single component in an integrated circuit, are divided as functions of one or more components in an integrated circuit (e.g., aspects of the arbiter 320 and controller 350 are each provide by various components in an integrated circuit), or are implemented in any other suitable manner.

Using the allocated memory from the central memory pool 330 as a dejitter buffer, in an embodiment the arbiter 320 provides the dejittered data 304A (e.g., CBR data after use of the dejitter buffer) back to the port 310A. The dejittered CBR data 304A can be provided to the client (e.g., as discussed above in relation to FIG. 1).

In an embodiment, the central memory pool 330 can be implemented in SRAM or dynamic random access memory (DRAM), or any other suitable memory. For example, the type of memory can be decided based on the amount of dejitter needed in the system. Further, the central memory pool 330 can be on-device memory, or can be external memory.

In an embodiment, a section of the central memory pool 330 is reserved for descriptor memory. Descriptor memory is used to keep track of the data for each traffic flow 302A-N. The descriptors carry information on different parameters of each packet and can be used to track packets in the contents of the central memory pool 330. These parameters can include occupancy, sequence ID, or any other suitable parameters.

Since the dejitter buffer allocated from the central memory pool 330 is shared between multiple traffic flows 302A-N, it is possible for bandwidth and performance issues to arise. In an embodiment, this can be addressed by operating the arbiter 320 and the central memory pool 330 at higher bandwidth than all traffic flows 302A-N. The operating bandwidth can be higher than the operating rate of all ports 310A-N, together. In an embodiment, this reduces (or eliminates) bandwidth or performance issues.

Figure 4:
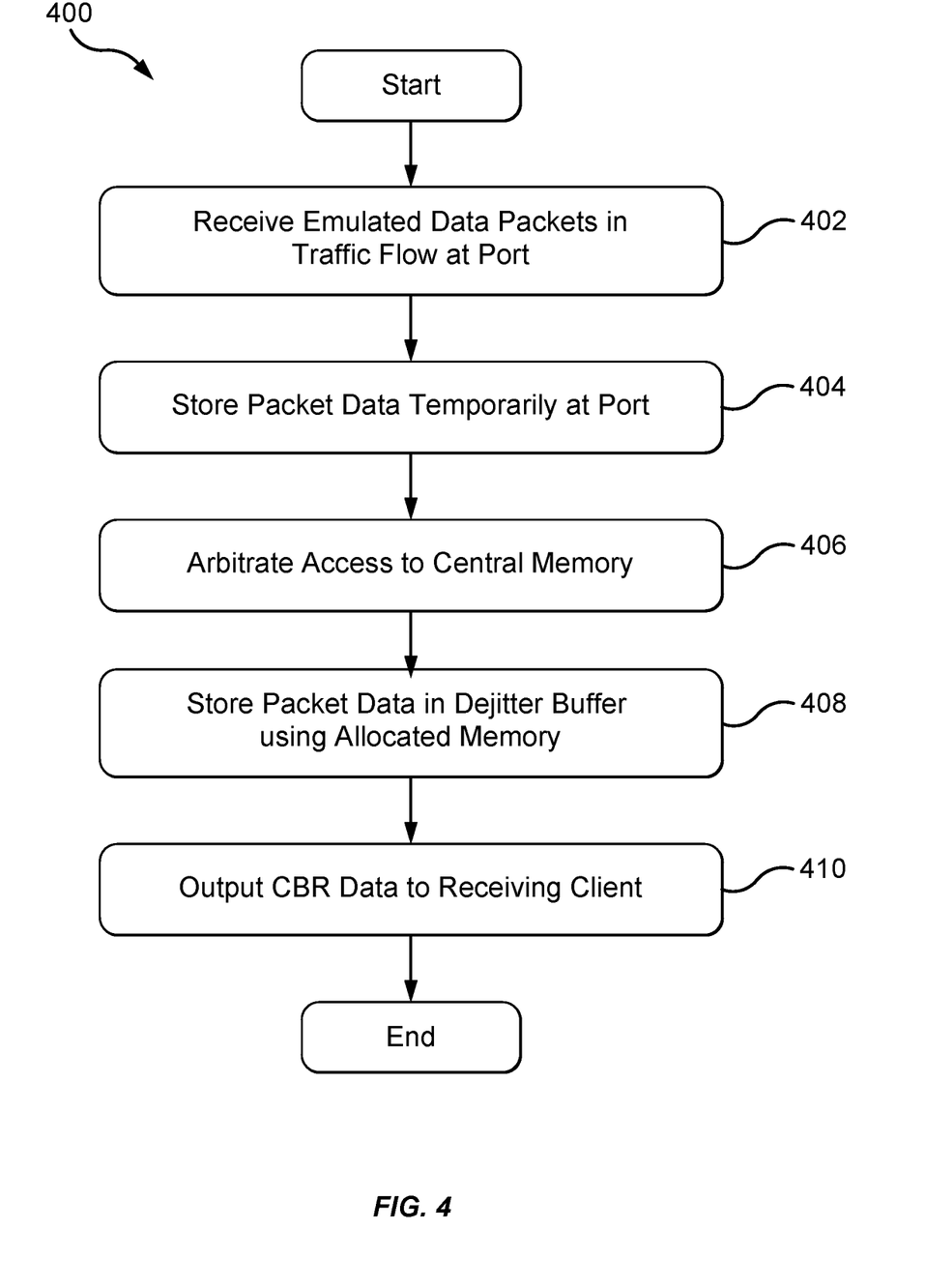
FIG. 4 is a flowchart illustrating dynamic management of dejitter buffers for transmitting emulated network traffic over a packet network, according to one embodiment.

FIG. 4 is a flowchart 400 illustrating dynamic management of dejitter buffers for transmitting emulated network traffic over a packet network, according to one embodiment. In an embodiment, the flowchart corresponds with the system 300 illustrated in FIG. 3 and will be discussed along with that system, for illustration. This is merely an example, and the techniques illustrated in FIG. 4 can be used with any suitable computing environment.

At block 402, a port (e.g., one of the ports 310A-N illustrated in FIG. 3) receives emulated data packets in a traffic flow. For example, as discussed above in relation to FIG. 1, a computing environment can transmit CBR data over a packet network using emulation. The port can receive data packets, over a packet network, encapsulating data transmitted over the network. In an embodiment, this data is CBR data when provided by a client for transmission, and should be CBR data when provided to a receiving client, but is transmitted between clients using emulation over a packet network.

At block 404, a buffer at the port stores the packet data temporarily. As discussed above in relation to FIG. 3, in an embodiment each port contains one or more intermediary buffers for temporary storage of data, before the data is written into or read from a central memory pool. The ports can also maintain statistics associated with the corresponding traffic flow.

At block 406, an arbiter (e.g., the arbiter 320 illustrated in FIG. 3) arbitrates access to a central memory. In an embodiment, as discussed above in relation to FIG. 3, the arbiter acts as a central arbiter to manage access of different flows (e.g., flows from each of the ports) to a central memory pool, and allocates one or more portions of the central memory pool to act as a dejitter buffer for each port. For example, the arbiter can manage read and write access for each of the traffic flows to a single central memory pool. The arbiter can perform arbitration for write and read paths independently, and can use any suitable arbitration mechanism (e.g., round robin arbitration).

At block 408, the arbiter (or any other suitable component) stores packet data in a dejitter buffer using allocated memory. As discussed above, this packet data can be stored in the dejitter buffer to allow the system to provide CBR data to the receiving client. In an embodiment, memory is allocated for the dejitter buffer prior to transmission (e.g., at a per-port level). For example, a controller can maintain a repository of available free space in the central memory pool and, based on availability and requested size, the controller can allocate memory from the central memory pool (e.g., for a given traffic flow) and can manage appropriate offsets. This is merely an example. Further, any traffic flow can request larger or smaller memory, dynamically, at runtime. In an embodiment, when a change of memory size is requested, the existing queue is purged (e.g., by the controller).

At block 410, the port outputs CBR data to the receiving client. As discussed above, the CBR data can be output to any suitable output medium, including an optical fiber, copper cable, or any other suitable output medium.

Figure 5:
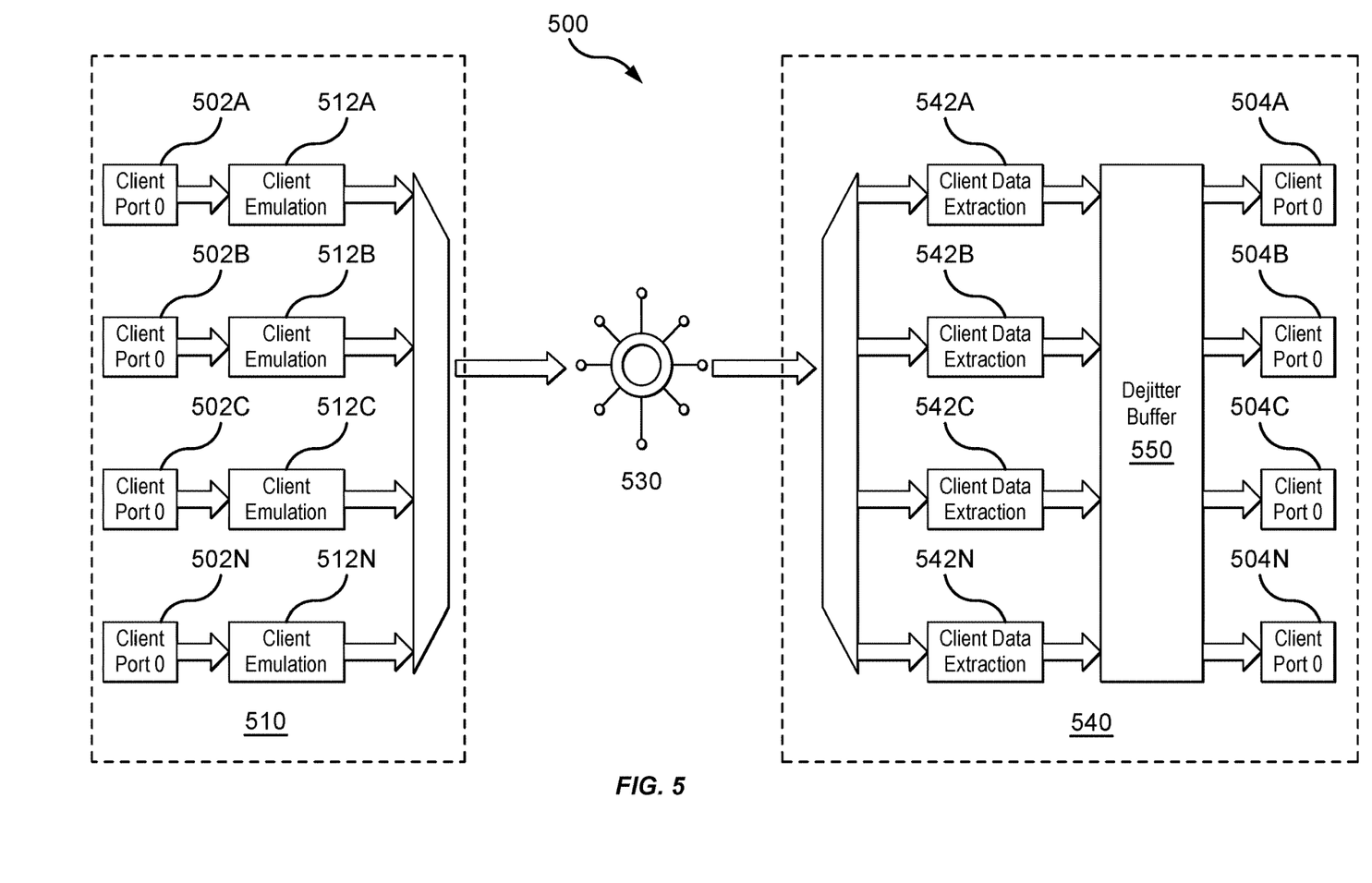
FIG. 5 further illustrates dynamic management of dejitter buffers for transmitting emulated network traffic over a packet network, according to one embodiment.

FIG. 5 further illustrates dynamic management of dejitter buffers for transmitting emulated network traffic over a packet network, according to one embodiment. A system 500 includes a number of transmitting client ports 502A-N transmit data to a number of recipient client ports 504A-N using a packet network 520. For example, on a transmit side 510 of the system 500, a number of client emulation elements 512A-N emulate data from the client ports 502A-N for transmission over the packet network 530. The data is transmitted over the packet network 530 from the transmit side 510 to a receive side 540 (e.g., using emulated packets, as discussed above in relation to FIG. 1).

At the receive side 540, a number of client data extraction elements 542A-N extract the data (e.g., from the emulated packets) and provide the extracted data to a shared dejitter buffer 550. In an embodiment, the shared dejitter buffer 550 allocates an appropriate dejitter buffer for each client data extraction element 542A-N from a central memory pool, using an arbiter and controller, as discussed above in relation to FIGS. 3-4. The shared dejitter buffer 550 compensates for packet delay variations in the emulated traffic transmitted over the packet network 530, and provides CBR data for output to the client ports 504A-N.

In an embodiment, the system 500 reflects an improved solution for transmitting emulated network traffic over a packet network.

Similar to FIG. 2, assume four different line rates are used in the system 500. The port 502A is associated with a rate of 1 GFC, which is approximately 1 Gbit/second. The port 502B is associated with a rate of OC48, which is approximately 2488 Mbit/second. The port 502C is associated with a rate of OTU2, which is approximately 10 Gbits/second. And the port 502N is associated with a rate of FC16, which is approximately 16 GBits/second. Thus, the line rates vary from approximately 1 Gbit/second for the 1 GFC port 502A to 16 Gbits/second for the 16 GFC port 502N.

Assume a 400 µs dejitter requirement for each port, just as in FIG. 2 discussed above. The 1 GFC port 502A would require a dejitter buffer of approximately 400 Kb, the OC48 port 502B would require a dejitter buffer of approximately 1 Mbit, the OTU2 port 502C would require a dejitter buffer of approximately 4 Mbits, and the FC16 port 502N would require a dejitter buffer of approximately 6 Mbits. Thus, the total dejitter buffer pool allocated would be less than 12 Mbits, which is less than half the 24 Mbits required for the same line rates in FIG. 2. And if more of the line rates are smaller (e.g., three 1 GFC lines with one 16 GFC line), the memory savings becomes even more significant.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A system, comprising:
    a plurality of ports each configured to receive emulated traffic transmitted over a packet network;
    a central memory pool;
    a controller configured to allocate memory from the central memory pool for a plurality of dejitter buffers; and
    an arbiter configured to arbitrate read and write access from the plurality of ports to the central memory pool for the plurality of dejitter buffers,
        wherein a portion of the central memory pool is allocated as a respective dejitter buffer, of the plurality of dejitter buffers, for each of the plurality of ports, based on a transmission rate associated with each respective port,
        wherein the controller is capable of allocating any portion of the central memory pool as the dejitter buffer for any respective port of the plurality of ports, and
        wherein the controller is configured to, during operation, dynamically change the portion of the central memory pool allocated as the dejitter buffer for a given port.

2. The system of claim 1, wherein each dejitter buffer is configured to output constant bit rate (CBR) data to an output medium based on the emulated traffic received from the packet network at the respective port.

3. The system of claim 1, wherein the arbiter is configured to use round robin arbitration to arbitrate read and write access from the plurality of ports to the central memory pool.

4. The system of claim 1, wherein the central memory pool comprises at least one of static random access memory (SRAM) or dynamic random access memory (DRAM).

5. The system of claim 1, wherein the central memory pool is an internal memory located on a same integrated circuit as the arbiter.

6. The system of claim 1, wherein the central memory pool is an external memory located on a different integrated circuit from the arbiter.

7. The system of claim 1, wherein each of the plurality of ports comprises an intermediary buffer configured for temporary storage of data before the data is written into or read from the central memory pool.

8. The system of claim 1, wherein the arbiter and the central memory pool are configured to operate at a higher bandwidth than each of the plurality of ports.

9. The system of claim 1, wherein the arbiter and the controller are combined on an integrated circuit.

10. A method, comprising:
    receiving emulated traffic at a plurality of ports over a packet network;

allocating a portion of a central memory pool as a dejitter buffer for each of the plurality of ports, based on a transmission rate associated with each respective port, wherein any portion of the central memory pool can be allocated as the dejitter buffer for any respective port;

arbitrating read and write access from the plurality of ports to the central memory pool for the respective dejitter buffers; and dynamically, during operation, changing the portion of the central memory pool allocated as the dejitter buffer for a first port of the plurality of ports.

11. The method of claim 10, wherein each dejitter buffer is configured to output constant bit rate (CBR) data to an output medium based on the emulated traffic received from the packet network at the respective port.

12. The method of claim 10, wherein the arbitrating read and write access from the plurality of ports to the central memory pool for the respective dejitter buffers uses round robin arbitration.

13. The method of claim 10, wherein the central memory pool comprises at least one of static random access memory (SRAM) or dynamic random access memory (DRAM).

14. The method of claim 10, further comprising:

temporarily storing data at an intermediary buffer associated with a port, of the plurality of ports, before the data is written into or read from the central memory pool.

15. The method of claim 10, wherein the arbitrating and accessing the central memory pool each operate at a higher bandwidth than each of the plurality of ports.

16. A non-transitory computer program product comprising:

one or more non-transitory computer readable media containing, in any combination, computer program code that, when executed by operation of any combination of one or more processors, performs operations comprising:

receiving emulated traffic at a plurality of ports over a packet network;

allocating a portion of a central memory pool as a dejitter buffer for each of the plurality of ports, based on a transmission rate associated with each respective port, wherein any portion of the central memory pool can be allocated as the dejitter buffer for any respective port;

arbitrating read and write access from the plurality of ports to the central memory pool for the respective dejitter buffers; and dynamically, during operation, changing the portion of the central memory pool allocated as the dejitter buffer for a first port of the plurality of ports.

17. The non-transitory computer program product of claim 16, wherein each dejitter buffer is configured to output constant bit rate (CBR) data to an output medium based on the emulated traffic received from the packet network at the respective port.

18. The non-transitory computer program product of claim 16, wherein the arbitrating read and write access from the plurality of ports to the central memory pool for the respective dejitter buffers uses round robin arbitration.

19. The non-transitory computer program product of claim 16, wherein the central memory pool comprises at least one of static random access memory (SRAM) or dynamic random access memory (DRAM).

20. The non-transitory computer program product of claim 16, further comprising:

temporarily storing data at an intermediary buffer associated with a port, of the plurality of ports, before the data is written into or read from the central memory pool.

\* \* \* \* \*